United States Patent [19]

Gneiss et al.

[11] Patent Number: 5,030,479
[45] Date of Patent: Jul. 9, 1991

[54] METHOD FOR PRODUCING AN AIR FLOW RATE METER SUBSTRATE

[75] Inventors: Heinz Gneiss, Ludwigsburg; Wolfgang Kienzle, Hemmingen; Rudolf Sauer, Benningen; Weiner Wuensch, Unterriexingen, all of Fed. Rep. of Germany

[73] Assignee: Robert Bosch GmbH, Stuttgart, Fed. Rep. of Germany

[21] Appl. No.: 515,959

[22] Filed: Apr. 27, 1990

Related U.S. Application Data

[62] Division of Ser. No. 292,868, Jan. 3, 1989, Pat. No. 4,944,182.

[30] Foreign Application Priority Data

Jan. 16, 1988 [DE] Fed. Rep. of Germany ....... 3801165
Nov. 12, 1988 [DE] Fed. Rep. of Germany ....... 3838466

[51] Int. Cl.$^5$ .......................... B05D 5/12; B05D 1/18
[52] U.S. Cl. .................................... 427/102; 427/284; 427/443.2

[58] Field of Search ...................... 427/102, 284, 443.2; 29/825, 612, 620; 73/204.26

[56] References Cited

U.S. PATENT DOCUMENTS

| 3,243,867 | 4/1966 | Bernstein | 427/443.2 X |
| 3,817,782 | 6/1974 | Klein et al. | 427/79 |
| 3,900,819 | 8/1975 | Djorup | 73/204.26 X |
| 4,300,391 | 11/1981 | Eiermann | 73/204.26 |
| 4,307,129 | 12/1981 | Nisigahana | 427/58 |
| 4,833,912 | 5/1985 | Ohta et al. | 73/204.26 X |

FOREIGN PATENT DOCUMENTS 0048359  3/1982  European Pat. Off. ......... 73/204.26

Primary Examiner—Evan Lawrence
Attorney, Agent, or Firm—Edwin E. Greigg; Ronald E. Greigg

[57] ABSTRACT

A method for producing an air flow rate meter substrate which includes at least one resistive film on one side of the substrate with a teardrop end face that faces the direction of air flow to be determined, formed by dipping the face end of the substrate into a liquid plastic or a lacquer composition.

4 Claims, 1 Drawing Sheet

METHOD FOR PRODUCING AN AIR FLOW RATE METER SUBSTRATE

This is a division of co-pending application Ser. No. 292,868 filed on Jan. 3, 1989, now U.S. Pat. No. 4,944,182.

BACKGROUND OF THE INVENTION

The invention is based on an air flow rate meter as defined hereinafter. In a known air flow rate meter, to prevent the particles floating in the air from being deposited on the substrate, the faces facing into the flow are as small and rounded as possible, to keep the amount of deposits collecting there during air flow rate meter operation minimal. Such deposits not only affect the flow course in the vicinity of the substrate, but also cause poorer thermal behavior of the air flow rate meter, making the air flow rate meter thermally more sluggish by slowing down the measurement speed as the air flow rate varies. Nor are the precautions taken in the known air flow rate meter capable over the long run of preventing such deposits, so that the aforementioned kind of undesirable change in the characteristic curve of the air flow rate meter eventually occurs.

OBJECT AND SUMMARY OF THE INVENTION

The air flow rate meter according to the invention both insofar as the article and its method of manufacture have the advantage over the prior art that even when the air flow rate meter is new, the leading edge of the body produces an effect approximately equivalent to long-term soiling over a period of use, so that this effect is already taken into account in the initial calibration of the air flow rate meter. During use of the air flow rate meter, deposits which then form on the leading body have only a negligible effect on the characteristic curve of the air flow rate meter. By dipping the holder body end face that extends into the flow into a liquid plastic or lacquer compound, production of a teardrop-shaped and hence streamlined leading body becomes particularly economical and simple.

It is advantageous in one concept of this invention to embody the leading edge of the body as U-shaped, and to use the legs of the U to slip it onto the holder and thereby secure it to the body.

It is also advantageous to make the leading edge of the body of sheet metal, plastic or lacquer.

To avoid an electrostatic charging of the plastic or lacquer leading body, this element is advantageously made from electrically conductive plastic or lacquer.

It is also advantageous to connect the leading edge of the body, made of electrically conductive plastic or lacquer, to an electrical ground line.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
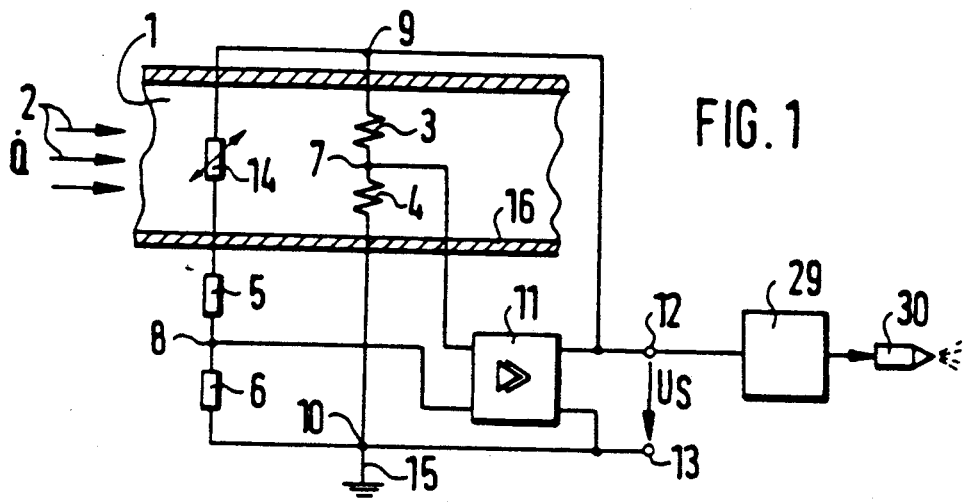
FIG. 1 shows the circuitry of an air flow rate meter.

In FIG. 1, a flow cross section 1 is show, for instance an air intake tube of an internal combustion engine, not shown, through which a medium, for instance the air aspirated by the engine, flows in the direction of the arrows 2. Located in the flow cross section 1, as part of an air flow rate meter, is a temperature-dependent measuring resistor 3, for instance a hot film, through which the output variable of a controller flows and which at the same time furnishes the input variable for the controller. The temperature of the temperature-dependent resistor 3 is regulated by the controller to a fixed value, which is above the mean air temperature. If the flow rate, i.e., the quantity of air flowing per unit of time having a throughput value of increases, then the temperature-dependent resistor 3 cools down to an increased extent. This cooling is fed back to the input of the controller, causing the controller to raise its output variable such that the set temperature value is re-established at the temperature-dependent measuring resistor 3. If the air throughput value changes, the output variable of the controller regulates the temperature of the temperature-dependent measuring resistor 3 to the predetermined value and at the same time serves as a standard for the flowing air quantity, which as a measured throughput value $U_S$ may for instance be supplied to a metering circuit of an internal combustion engine, for adapting the required fuel quantity to the air quantity aspirated per unit of time.

The temperature-dependent measuring resistor 3 is disposed in a resistor measuring circuit, e.g., a bridge circuit, and with a reference resistor 4 forms a first bridge branch, to which a second bridge branch comprising the two fixed resistors 5 and 6 is connected in parallel. One pickup point 7 is located between the resistors 3 and 4, and another pickup point 8 is located between the resistors 5 and 6. The two bridge branches are connected in parallel at points 9 and 10. The diagonal bridge voltage that appears between the points 7 and 8 is furnished to the input of an amplifier 11, to the output terminals of which the points 9 and 10 are connected, so that its output variable supplies the bridge with operating voltage or current. The measured throughput value $U_S$, simultaneously serving as a control variable, can be picked up between terminals 12 and 13, as shown.

The temperature-dependent measuring resistor 3 is heated by the current flowing through it, up to a value at which the input voltage of the amplifier, that is, the bridge diagonal voltage, either becomes zero or assumes a predetermined value. A certain current then flows into the bridge circuit from the output of the amplifier 11. Now if the temperature of the temperature-dependent measuring resistor 3 changes because of changes in the mass of the flowing air, then the voltage at the bridge diagonal changes, and the amplifier 11 regulates the bridge supply voltage or current to a value at which the bridge is again balanced, or is imbalanced in an intended manner. The output variable of the amplifier 11, that is, the control variable $U_S$, and the current of the temperature-dependent measuring resistor 3 both represent a throughput value for the flowing quantity of air, such as the quantity of air aspirated by an engine, and can be fed to an electronic control unit 29 which for instance triggers at least one fuel injection valve 30.

To compensate for the effect of the air temperature on the result of measurement, it may be suitable to incorporate a second temperature-dependent compensating resistor 14, around which the air flows, into the second bridge branch. The magnitude of the resistors 5, 6 and 14 should be selected such that the power loss of the temperature-dependent resistor 14 virtually does not change with changes in the bridge voltage but instead is always equivalent to the temperature of the air flowing past it. The reference resistor 4 is suitably also disposed in the flow cross section 1 or is in thermally conductive communication with the wall 16 of the air intake tube that defines the flow conduit cross section, so that the lost heat of the reference resistor 4 can be dissipated by the flowing air or by the wall 16. An electric ground connection 15 is connected for instance to the point 10.

Figure 2:
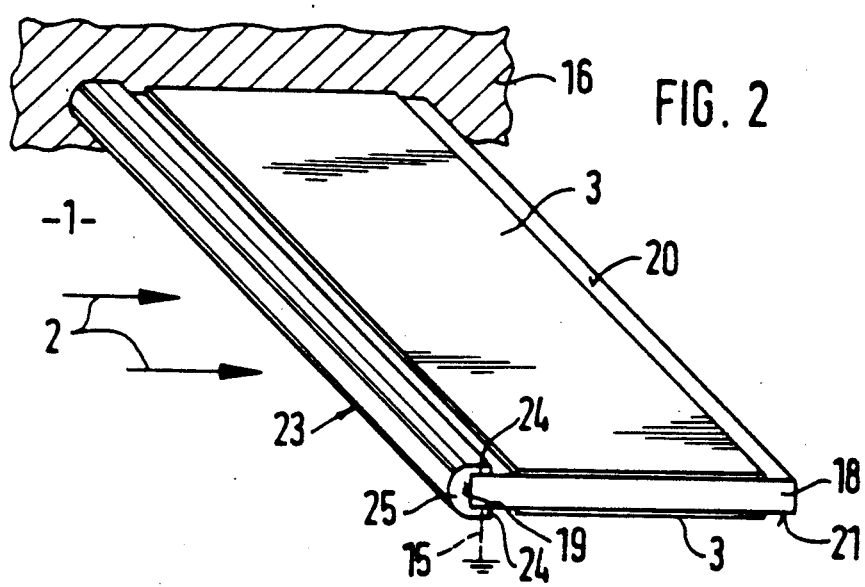
FIGS. 2–4 each show a fragmentary view of an exemplary embodiment of an air flow rate meter.

In the exemplary embodiment of an air flow rate meter shown in FIG. 2 fragmentary form and not to scale, a flat holder body or substrate 18 is disposed on the wall 16 of the air intake tube defining the flow cross section 1; the substrate is rectangular in cross section both in the air flow direction 2 and transversely to it. The substrate 18 may comprise electrically insulating material, such as ceramic, or an electrically conductive material, in which case it is coated with an electrically insulating layer, not shown. The substrate 18 which extends into the flow cross section transversely to the flow direction 2 has an end face 19 of rectangular cross section facing into the flow, and an upper side face 20 and a lower side face 21 extending virtually parallel to the flow direction. The measuring resistor 3, embodied as a film or coating, is disposed on at least one of the side faces 20, 21. The measuring resistor 3 may also be disposed in the manner shown on both side faces 20, 21, but there may instead be different resistor films, for instance of the bridge. On the end face 19 of the substrate 18 facing into the flow, i.e., counter to the flow direction 2, a leading edge of a body 23 is provided, having a slight wall thickness from about one-tenths millimeter to approximately about one millimeter; in the exemplary embodiment shown, it is U-shaped. The two legs 24 of the leading body 23 protrude partway over the side faces 20, 21 of the substrate 18 and substantially rest on it. The base 25 of the leading body 23 that joins the two legs 24 is preferably spherical where it faces into the flow. In this embodiment, the leading edge of body 23 may have its legs 24 clamped and/or glued to the substrate 18. Substances that are intrinsically suitable for avoiding deposits are also recommended as materials from which the leading body 23 can be made. The leading body may accordingly be of ceramic, glass, plastic lacquer, or other materials. In another embodiment, the leading edge of the body may also comprise a thin metal sheet that is easily bent into the shape of a U.

Figure 3:
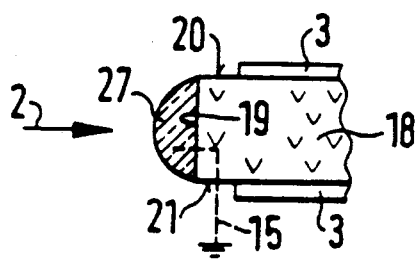

In FIG. 3, a second exemplary embodiment of the air flow rate meter is shown in fragmentary form; the reference numerals used above a used here as well for elements that remain the same and function the same. In contrast to the exemplary embodiment of FIG. 2, in which the leading body 23 was in the shape of a U, in that of FIG. 3 a leading edge of the body 27 is shown that covers only the end face 19 of the substrate 18 and is not arranged to contact and be secured to the several side faces 20, 21. Naturally, the leading edge of body 27 may protrude outward past the end face 19 somewhat in each direction. The leading edge of body 27 is again preferably spherical as it faces into the flow or in other words counter to the flow direction 2, so that the cross section of the leading edge of body 27 may for instance be embodied as part of a circle.

By the disposition of the leading body 23, 27 on the substrate 18, a quasi-soiled effect is attained while the air flow rate meter is still new, simulating the effect of deposits on it after it has been in service for some time, so that when the air flow rate meter is calibrated, this effect can be taken into account as well in a manner that accords with actual practice.

Figure 4:
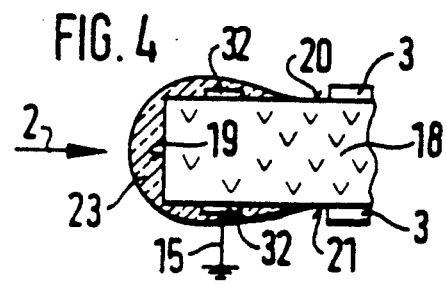

In the third exemplary embodiment of the air flow rate meter shown in fragmentary form in FIG. 4, the same reference numerals are again used for parts that are the same and function the same as those of the preceding embodiments. The shape of the leading edge of body 23 here is streamlined and teardrop-shaped in cross section. Such a shape is economically attained by dipping the end face 19 of the substrate 18 that faces into the flow into a liquid plastic or lacquer composition and allowing the material adhering to the substrate 18 after it is withdrawn from the composition to set.

To avoid vulnerability to soiling on the part of the plastic or lacquer leading edge of body 23, 27 of the exemplary embodiments of FIGS. 2-4 as a result of electrostatic charging, it may be advantageous to use electrically conductive plastic or lacquer. In addition, a leading edge of body 23, 27 made of this electrically conductive plastic or lacquer may be connected to the electrical ground line 15, as suggested in the various drawing figures. To this end, a zero conduction layer 32 may be applied to at least one of the side faces 20, 21 of the substrate 18 in the vicinity of the end face 19, as shown for instance in FIG. 4, with at least one of the legs of the U-shaped leading body 23 resting on this zero conduction layer and with this layer 32 connected to the ground line 15.

The foregoing relates to preferred exemplary embodiments of the invention, it being understood that other variants and embodiments thereof are possible within the spirit and scope of the invention, the latter being defined by the appended claims.

What is claimed is:

1. A method for producing an air flow rate meter substrate comprising at least one film arranged to serve as a temperature dependent measuring resistor, comprising the steps of forming the substrate with an end face which is intended to face an air flow, forming adjacent parallel side faces which are to be positioned parallel to the air flow, applying a resistive film on at least one of the side faces which serves as a resistor, and dipping the end face into a liquid plastic to form a teardrop shaped edge extending along a full length of said end face.

2. A method as defined in claim 1, in which said liquid plastic that forms the teardrop shaped edge extending along the full length of the end face is a lacquer composition.

3. A method as defined in claim 1, in which the liquid plastic is electrically conductive for connection to an electrical ground line.

4. A method as defined in claim 2, in which the lacquer composition is electrically conductive for connection to an electrical ground line.

* * * * *